United States Patent
Yetukuri et al.

(10) Patent No.: US 10,857,909 B2
(45) Date of Patent: Dec. 8, 2020

(54) ELECTRICAL ASSEMBLY

(71) Applicant: Lear Corporation, Southfield, MI (US)

(72) Inventors: Arjun Yetukuri, Rochester Hills, MI (US); Jasmine Pizana, Scottville, MI (US); David Gallagher, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/267,754

(22) Filed: Feb. 5, 2019

(65) Prior Publication Data

US 2020/0247275 A1 Aug. 6, 2020

(51) Int. Cl.
*B60N 2/02* (2006.01)
*B60N 2/879* (2018.01)

(52) U.S. Cl.
CPC ......... *B60N 2/0244* (2013.01); *B60N 2/0232* (2013.01); *B60N 2/879* (2018.02); *B60N 2002/0268* (2013.01); *B60N 2002/0272* (2013.01)

(58) Field of Classification Search
CPC .... B60N 2/0244; B60N 2/879; B60N 2/0232; B60N 2002/0268; B60N 2002/0272; H04R 1/20; H04R 1/222; H04R 1/32; H04R 1/342; H04R 3/005; H04R 2499/13
See application file for complete search history.

(56) References Cited

U.S. PATENT DOCUMENTS

| 4,558,459 A | 12/1985 | Noso et al. |
| 4,797,924 A | 1/1989 | Schnars et al. |
| 5,319,248 A * | 6/1994 | Endou .................. G05B 19/238 307/10.1 |
| 6,674,865 B1 | 1/2004 | Venkatesh et al. |
| 7,123,727 B2 | 10/2006 | Elko et al. |
| 2004/0158460 A1 | 8/2004 | Finn et al. |
| 2005/0265560 A1 | 12/2005 | Haulick et al. |
| 2007/0262574 A1 | 11/2007 | Breed et al. |
| 2009/0055180 A1* | 2/2009 | Coon ................... B60R 16/0373 704/251 |
| 2010/0208914 A1* | 8/2010 | Ohtsuka ................. H04R 3/005 381/86 |
| 2015/0006184 A1* | 1/2015 | Marti ...................... G10L 15/22 704/275 |
| 2015/0117669 A1* | 4/2015 | Kwon .................... H04R 1/326 381/86 |

(Continued)

*Primary Examiner* — Jason R Kurr
(74) *Attorney, Agent, or Firm* — Fishman Stewart PLLC (57) ABSTRACT

An electrical assembly includes a seat, an electronic control unit, a seat sensor assembly, and a microphone. The electronic control unit may be configured to control movement of the seat. The microphone may be connected to the electronic control unit. The electronic control unit may be configured to determine, via the seat sensor assembly, a position of an occupant of the seat and/or a distance between the occupant and the microphone. The electronic control unit may be configured to modify at least one of a gain and/or a sensitivity associated with the microphone according to the position and/or the distance. The distance may be the distance between a head of said occupant and the microphone. The seat may include a seat base, a seat back, and/or a head restraint. The seat sensor assembly may be configured to provide information about a position of the seat.

20 Claims, 6 Drawing Sheets

(56) References Cited

U.S. PATENT DOCUMENTS

| | | | |
|---|---|---|---|
| 2015/0256933 A1* | 9/2015 | Vautin | H04M 1/6083 |
| | | | 381/86 |
| 2015/0350758 A1* | 12/2015 | Zhao | H04R 1/08 |
| | | | 381/86 |
| 2016/0080861 A1* | 3/2016 | Helm | B60R 11/0247 |
| | | | 381/86 |
| 2018/0352362 A1* | 12/2018 | Volkmar | H04S 7/302 |
| 2019/0069084 A1* | 2/2019 | Sullivan, Jr. | H04R 1/406 |
| 2019/0320259 A1* | 10/2019 | Perl | H04R 1/20 |

* cited by examiner

ELECTRICAL ASSEMBLY

TECHNICAL FIELD

The present disclosure generally relates to electrical assemblies, including electrical assemblies that may be used in connection with sound in vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex and/or may not provide sufficient functionality. Some electrical assemblies may not be configured to determine the distance between a microphone and a head of an occupant.

There is a desire for solutions/options that minimize or eliminate one or more challenges or shortcomings of electrical assemblies. The foregoing discussion is intended only to illustrate examples of the present field and should not be taken as a disavowal of scope.

SUMMARY

In embodiments, an electrical assembly may include a seat, an electronic control unit, a seat sensor assembly, and/or a microphone. The electronic control unit may be configured to control movement of the seat. The microphone may be connected to the electronic control unit. The electronic control unit may be configured to determine, via the seat sensor assembly, a position of an occupant of the seat and/or distance between said occupant and the microphone. The electronic control unit may be configured to modify at least one of a gain and/or a sensitivity associated with the microphone according to the position and/or the distance. The distance may be the distance between a head of said occupant and the microphone. The seat may include a seat base, a seat back, and/or a head restraint. The microphone may be connected to the head restraint. The seat sensor assembly may be configured to provide information about a position of the seat. The seat sensor assembly may be configured to obtain/provide information about one or more seats and may be included with and/or separate from the seat (e.g., one or more sensors may be included with the seat and/or one or more sensors may be separate from the seat). The seat sensor assembly may include a camera. The seat sensor assembly may include one or more seat motor sensors.

With embodiments, the seat sensor assembly may include one or more proximity sensors. The seat sensor assembly may include one or more biometric sensors. The electronic control unit may be configured to determine, via the seat sensor assembly, a location of a head of said occupant. The electronic control unit may be configured to receive information from the camera to determine which occupant is speaking. The microphone may include a first state and/or a second state. The electronic control unit may be configured to cause the microphone to change from the first state to the second state if said occupant provides a wake-up command. When the microphone is in the second state, the electronic control unit may be configured to receive one or more seat movement commands. When the microphone is in the second state, the electronic control unit may be configured to move the seat according to the one or more seat movement commands. The electronic control unit may be configured to determine a direction of the seat. The electrical assembly may include at least one additional seat and/or at least one additional microphone. The microphone may be connected to the seat, and/or each additional microphone may be connected to a respective additional seat.

In embodiments, a method of operating an electrical assembly may include providing an electronic control unit, a seat, a microphone, and/or a seat sensor assembly. The method may include obtaining, via the electronic control unit, first information from the seat sensor assembly. The method may include modifying, via the electronic control unit, at least one of a gain and/or a sensitivity associated with the microphone according to the first information. The method may include obtaining, via the electronic control unit, second information from the microphone and/or determining, via the electronic control unit and/or the second information, a desired movement of the seat. The method may include moving the seat according to the desired movement.

With embodiments, modifying at least one of the gain and/or the sensitivity may include determining a position of a head of an occupant and/or a distance between the head of an occupant and the microphone. Modifying at least one of the gain and/or the sensitivity may include modifying at least one of the gain and/or the sensitivity proportionate to the distance. Determining the desired movement of the seat may include determining a source of a voice command via a camera of the seat sensor assembly. Modifying at least one of the gain and/or the sensitivity may include determining a direction of the seat. The first information may include seat position information, and/or the second information may correspond to the voice command.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
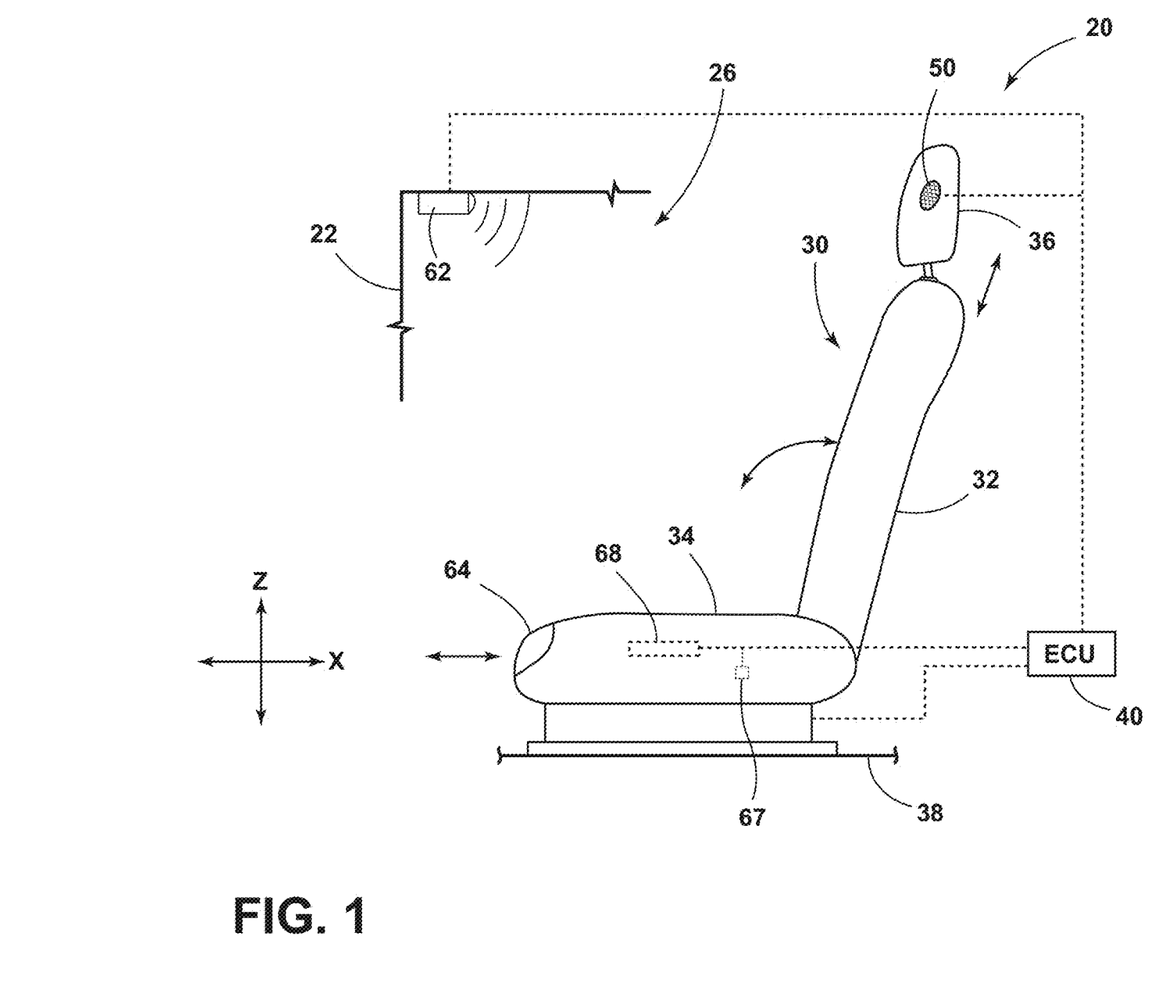
FIG. 1 is a side view generally illustrating an embodiment of an electrical assembly according to teachings of the present disclosure.
Figure 2:
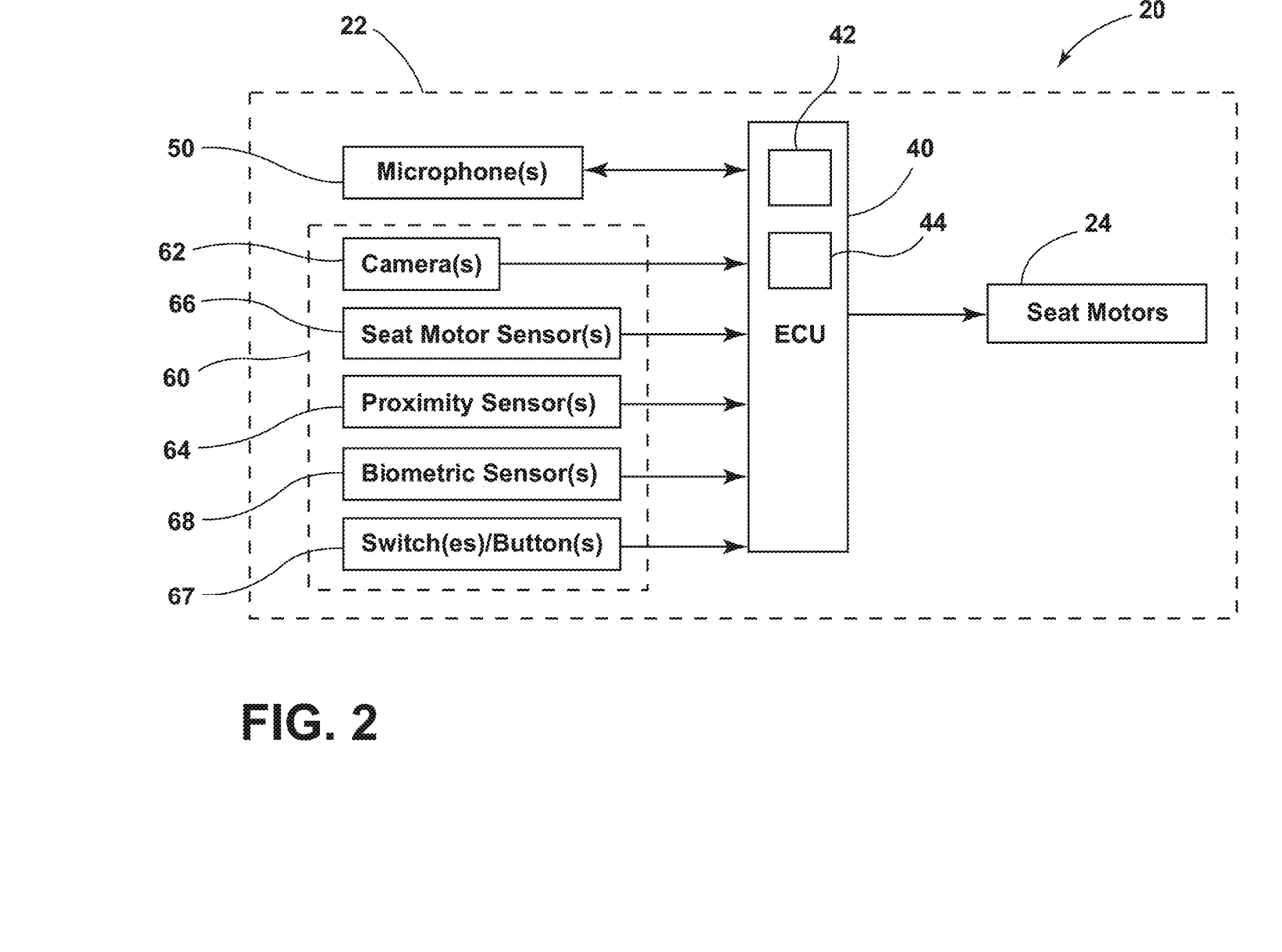
FIG. 2 is a schematic generally illustrating an embodiment of an electrical assembly according to teachings of the present disclosure.

In embodiments, such as generally illustrated in FIGS. 1 and 2, an electrical assembly 20 may include a seat 30, an electronic control unit (ECU) 40, a microphone 50, and/or a seat sensor assembly 60. The seat 30 may include a seat back 32, a seat base 34, and/or a head restraint 36. The seat back 32 may be connected to the seat base 34. The seat back 32 may, at least in a first position, be substantially vertical. The seat base 34 may, at least in a first position, be substantially horizontal and/or may be connected to a mounting surface 38 (e.g., a floor of a vehicle 22). The microphone 50 may be connected to the ECU 40. The microphone 50 may be disposed substantially in the seat 30 and/or outside the seat 30, such as in the cabin 26 of a vehicle 22. The ECU 40 may be configured to control one or more vehicle functions (e.g., an HVAC system, an entertainment system, a vehicle propulsion system/powertrain, a navigation system, etc.) The ECU 40 may be configured to control (e.g., automatically), at least in part, movement of the seat 30. The ECU 40 may be connected to one or more seat motors 24 that may be configured to move the seat back 32, the seat base 34, and/or the head restraint 36. The electrical assembly 20 may be configured to move the seat back 32, the seat base 34, and/or the head restraint 36 according to (e.g., based on, utilizing, etc.) voice inputs that may be received by the microphone 50. Movement of the seat 30 may include one or more of a variety of movements, such as, for example and without limitation, tilting the seat base 34 and/or seat back 32, moving the seat 30 (e.g., the seat base 34 and/or the head restraint 36) in the X-direction, Y-direction, and/or Z-direction, and/or rotating the seat 30 (e.g., about an axis parallel with the Z-direction).

With embodiments, the seat sensor assembly 60 may be connected to the ECU 40 and/or the ECU 40 may be configured to receive information from the seat sensor assembly 60. The seat sensor assembly 60 may be configured to determine the location (e.g., position) of the seat 30 in the vehicle cabin 26. If the microphone 50 is disposed in the head restraint 36 of the seat 30, the ECU 40 may be configured to determine the location of the microphone 50 (e.g., the head restraint 36) via the seat sensor assembly 60. The seat sensor assembly 60 may include any number of sensors (e.g., a single sensor or a plurality of sensors), such as cameras 62, proximity sensors 64, and/or seat motor sensors 66, among others. The ECU 40 may be configured to determine the location of the microphone 50 via the seat motor sensors 66 (e.g., the ECU 40 may determine the location of the microphone 50 based on the amount of actuation of the seat motors 24). For example and without limitation, the ECU 40 may be configured to determine a current location of the microphone 50 via modifying a known/initial location of the microphone 50 according to the amount of actuation of the seat motors 24, such as sensed via the seat motor sensor(s) 66.

With embodiments, such as generally illustrated in FIG. 2, the electrical assembly 20 may include an ECU 40. The ECU 40 may be connected to a microphone 50 and/or the seat sensor assembly 60. The ECU 40 may be configured to obtain information from the microphone 50 (e.g., a voice command from a seat occupant 70) and/or the ECU 40 may be configured to move the seat 30 according to the information received by the microphone 50. The ECU 40 may be connected to the seat motors 24 of the seat back 32, the seat base 34, and/or the head restraint 36 such that the ECU 40 may be configured to move the seat 30 (e.g., the seat back 32, the seat base 34, and/or the head restraint 36). Additionally or alternatively, the ECU 40 may be configured to determine the position of the seat 30 from first information from the seat sensor assembly 60 (e.g., the seat motor sensors 66).

In embodiments, an electrical assembly 20 may include an occupant/user interface 67. The user interface 67 may be connected to and/or included with the seat sensor assembly 60. The user interface 67 may, for example and without limitation, include one or more buttons or switches, such as physical and/or electronic/virtual buttons or switches that may be connected to the seat 30 and/or provided via a display (e.g., of an infotainment system). An occupant 70 may interact with the user interface 67 to move the seat 30. For example and without limitation, the user interface 67 may include one or more buttons connected to the seat 30 to control movement of the seat 30. The ECU 40 may actuate the motors 24 according to information/input from the user interface 67.

With embodiments, the ECU 40 may be configured to modify the gain and/or the sensitivity associated with a microphone 50 according to the information from the seat sensor assembly 60 (e.g., from the user interface 67). The information may include a direction of movement of the seat 30. For example and without limitation, the ECU 40 may be configured to increase the gain and/or sensitivity if the user interface 67 receives input to move at least a portion of the seat 30 away from the microphone 50 (e.g., if the occupant 70 operates a button rearward to slide the seat base 34 rearward and the microphone 50 is connected at or about a front of the vehicle cabin 26). If a direction of travel of the seat 30, which may be determined via the seat sensor assembly 60, is away from a microphone 50, the ECU 40 may increase the gain and/or the sensitivity associated with that microphone 50. If the microphone 50 is connected to the seat 30, the ECU 40 may increase the gain and/or sensitivity, at least to some degree, if the occupant 70 reclines the seat back 32 as the head 72 of an occupant 70 may tend to move away from the seat back 32 and/or the head restraint 36 (and a microphone 50 connected thereto) as the seat back 32 reclines.

In embodiments, an occupant 70 may provide (e.g., speak) a command for moving the seat 30, such as to move the seat 30 forward, and the command may be received by the microphone 50. The ECU 40 may be configured to receive the command and/or information about the command (e.g., second information) from the microphone 50 and determine a corresponding action of the seat motors 24 to move the seat 30 (e.g., the seat base 34 forward). As an example, if an occupant 70 provides a command to tilt the seat back 32, the ECU 40 may be configured to receive the command or information about the command from the microphone 50 and determine a corresponding action of the seat motors 24 to tilt the seat back 32 backwards.

With embodiments, the ECU 40 may be configured to incrementally move the seat back 32 and/or the seat base 34 in a direction upon receiving a voice command. For example and without limitation, with each command to move the seat 30 forward, the ECU 40 may be configured to move the seat 30 forward a relatively small distance (e.g., an inch). Additionally or alternatively, the ECU 40 may be configured to continuously move the seat back 32 and/or the seat base 34 in a direction upon receiving a voice command. For example and without limitation, upon receiving a voice command, the ECU 40 may move the seat back 32 and/or seat base 34 in a direction until receiving a stop command from the occupant 70 (e.g., the occupant 70 may provide a second command for the seat 30 to stop). If the ECU 40 does not receive a stop command from the occupant 70, the ECU 40 may be configured to move the seat 30 to the furthest position in the desired direction. The ECU 40 may be configured to automatically stop movement of the seat 30 if a resistance is detected. For example and without limitation, if an occupant 70 commands the seat base 34 to move forward, the ECU 40 may stop movement of the seat base 34 if the legs of the occupant 70 contact another seat 30 and/or object/vehicle portion in the way (e.g., the ECU 40 and/or the seat sensor assembly 60 may sense a resistance to movement of the seat 30). As an additional example, if an occupant 70 commands the seat back 32 to tilt backwards, the ECU 40 may stop movement of the seat back 32 if the seat back 32 contacts another seat 30 and/or an occupant 70 in a seat 30 behind the moving seat 30 (e.g., the ECU 40 may sense a resistance to movement of the seat back 32).

In embodiments, the ECU 40 may be configured to check/compare positions of the seat 30 (e.g., as determined via the seat sensor assembly 60) with predetermined comfort and safety criteria such that movement of the seat 30 to an unsafe position may trigger a warning (e.g., visual and/or audible) before reaching the unsafe position. For example and without limitation, the ECU 40 may be configured to move the seat into restricted positions/locations. If the seat 30 is approaching a restricted position, the ECU 40 may stop movement of the seat 30. The ECU 40 may then request and/or await an additional command (e.g., a secondary confirmation) to continue movement to the restricted position. If the additional command is received, the ECU 40 may move the seat into the restricted position.

With embodiments, restricted positions of the seat 30 may include positions where the seat 30 may be too close and/or too far from the steering wheel, and/or positions of the seat 30 where safety devices (e.g., airbags) may not be as effective. The restricted positions may include positions at or near physical travel limits of the seat 30 (e.g., the ends of a track). If the ECU 40 is configured to move the seat 30 incrementally upon receiving a voice command, the ECU 40 may wait for the specific command/confirmation before incrementally moving the seat 30 into a restricted position (e.g., the ECU 40 may move the seat 30 until the seat 30 is a predetermined number of increments away from a restricted position and then request an additional command).

With embodiments, such as generally illustrated in FIGS. 1, 2, 3 and 4, the seat sensor assembly 60 may include one or more cameras 62. The camera 62 may be disposed in the vehicle 22 and/or the camera 62 may be connected to the ECU 40. The camera 62 may be disposed at a front of the vehicle cabin 26 and/or proximate the top of the vehicle cabin 26. One or more cameras 62 may be disposed in the vehicle cabin 26 and/or one or more cameras 62 may be disposed at least partially outside the vehicle cabin 26. The ECU 40 may be configured to receive information from the camera 62. For example and without limitation, the ECU 40 may be configured to determine the positions of the vehicle seats 30 from the information from the camera 62. The ECU 40 may be configured to determine the position of an occupant 70 in a vehicle seat 30. For example and without limitation, the ECU 40 may be configured to determine the location of a head 72 of an occupant 70 in relation to the seat 30 and/or the vehicle cabin 26.

In embodiments, the ECU 40 may be configured to determine the distance between the head 72 of an occupant 70 and the location of the microphone 50. The ECU 40 may be configured to receive information from the seat sensor assembly 60 (e.g., a camera 62) to determine the distance between a mouth 74 of the occupant 70 and the microphone 50. The microphone 50 may be disposed in the head restraint 36 of a seat 30, at the front of the vehicle cabin 26, and/or in the middle of the vehicle cabin 26.

Figure 3:
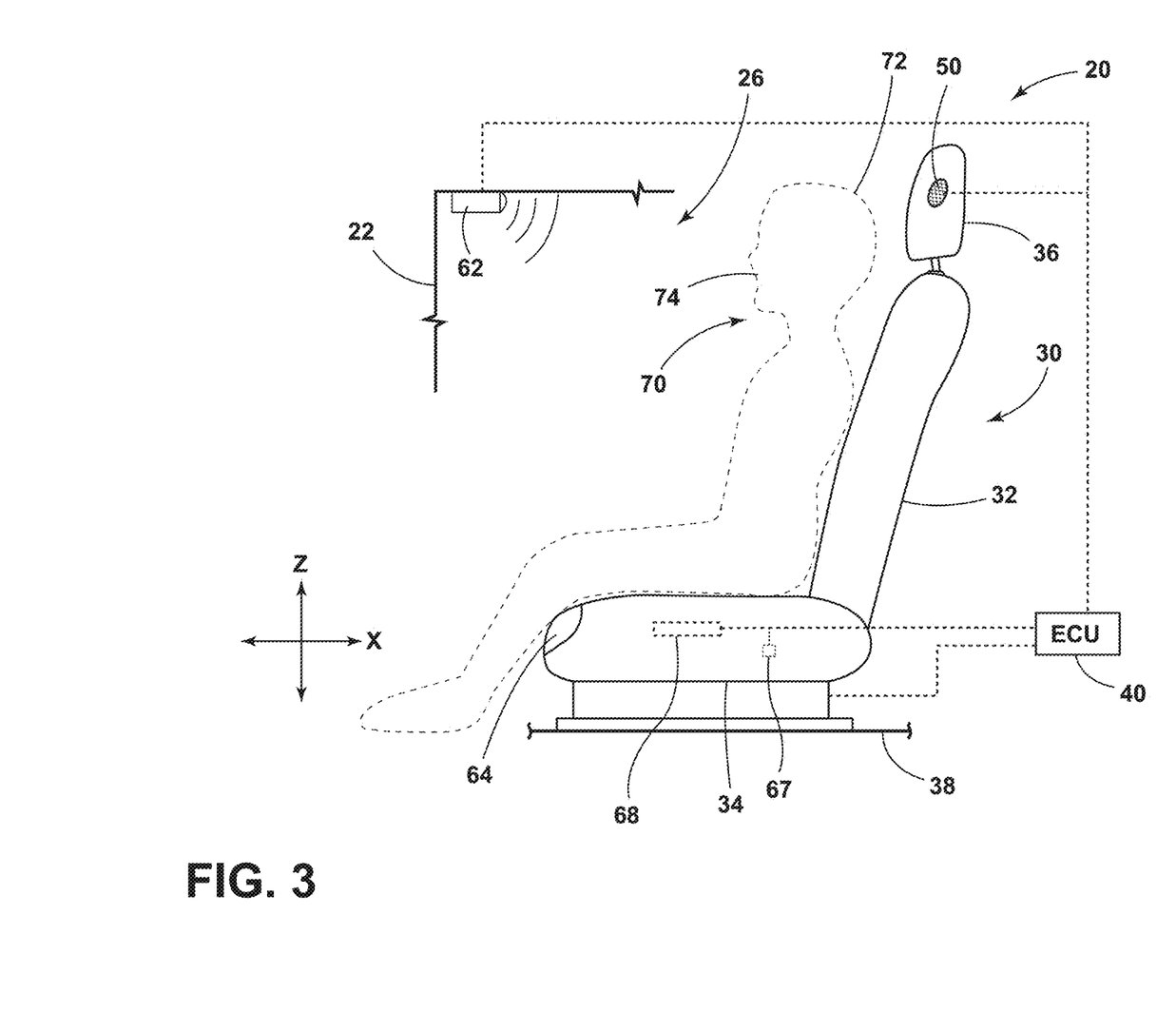
FIG. 3 is a side view generally illustrating an embodiment of an electrical assembly according to teachings of the present disclosure.
Figure 5:
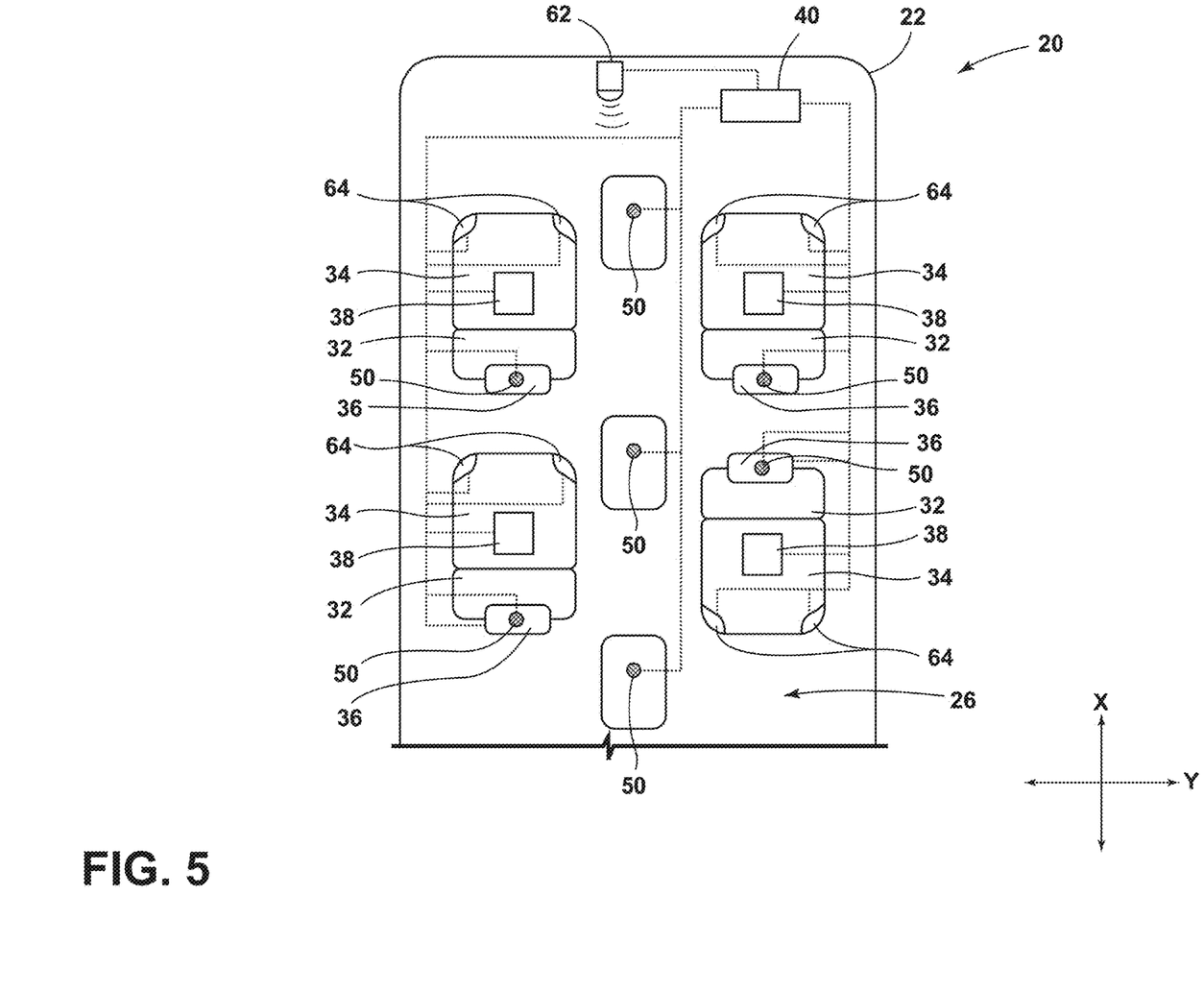
FIG. 5 is a top view generally illustrating an embodiment of an electrical assembly according to teachings of the present disclosure.

With embodiments, such as generally illustrated in FIGS. 1, 3, and 5, if the microphone 50 is disposed in the head restraint 36 of the seat 30, the microphone 50 may move with the seat 30 and the ECU 40 may be configured to determine the distance between the microphone 50 and the head 72 of the occupant 70. The ECU 40 may receive information from the seat sensor assembly 60 (e.g., the seat motor sensors 66), such as the tilt angle of the seat back 32, the direction/rotational position of the seat 30, the X-position of the seat 30, the Y-position of the seat 30, and/or the Z-position of the seat 30. The ECU 40 may receive first information from the seat sensor assembly 60 (e.g., the camera 62) to determine the position of the head 72 of the occupant 70 (e.g., the occupant 70 requesting seat movement). The ECU 40 may utilize image processing to determine the location of the head 72 of the occupant 70. The ECU 40 may be configured to determine the distance between the position of the microphone 50 (e.g., via sensors 66 connected to the seat motors 24 and/or the camera 62) and the position of the head 72 of an occupant 70 (e.g., via the camera 62). If the microphone 50 is disposed in a head restraint 36 (or other moveable component), the ECU 40 may be configured to adjust the position and/or orientation of the head restraint 36 to improve reception of the microphone 50. For example and without limitation, one or more head restraints 36 (e.g., of other seats 30) may be actuated to face the identified speaker in the vehicle cabin 26 for improved reception. Improving reception of the microphone 50 may decrease the gain that may be applied to the microphone 50.

Figure 4:
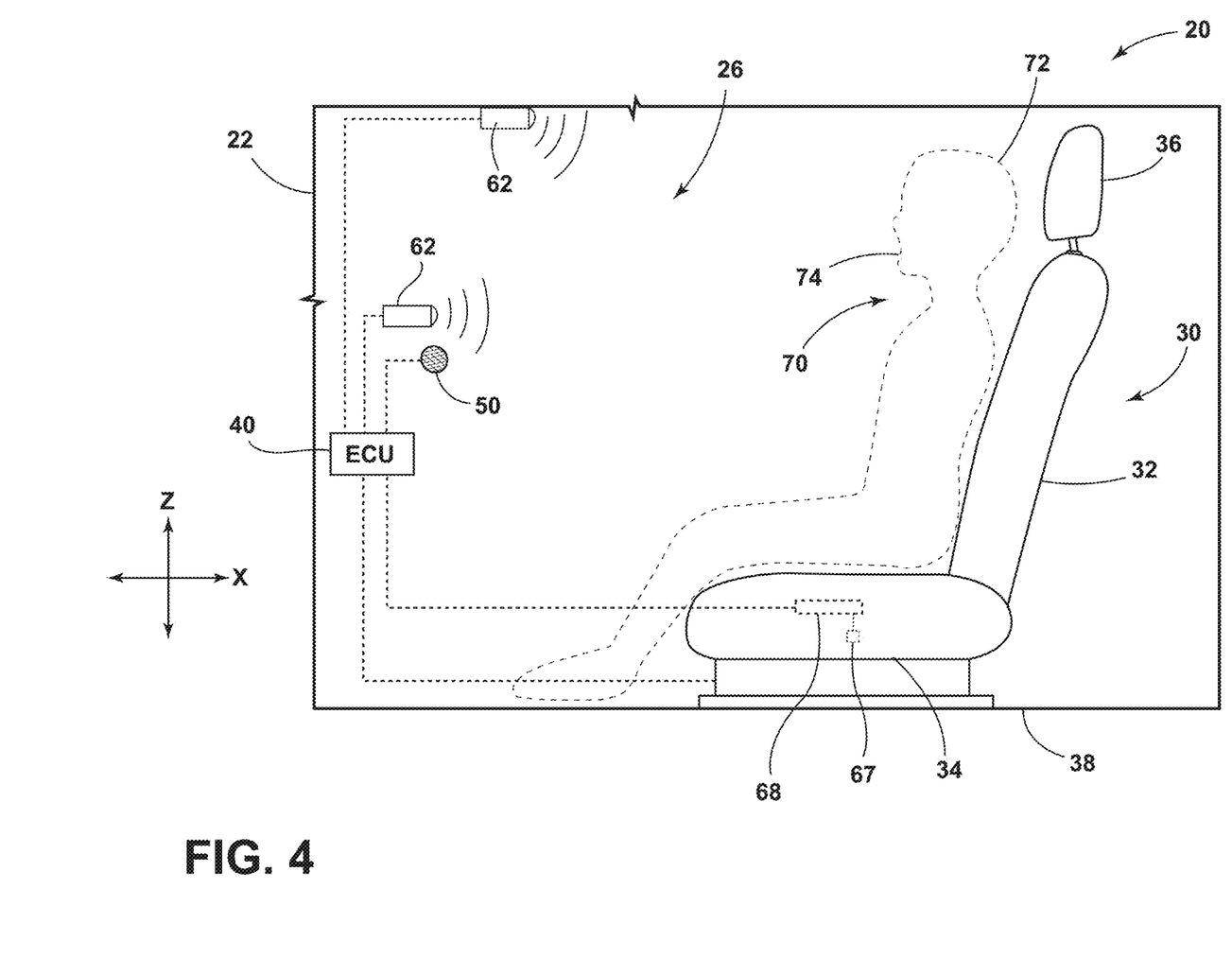
FIG. 4 is a side view generally illustrating an embodiment of an electrical assembly according to teachings of the present disclosure.

With embodiments, such as generally illustrated in FIG. 4, the microphone 50 may be disposed in a fixed location (e.g., the front of the vehicle cabin 26, the middle of the vehicle cabin 26, etc.), such as instead of being disposed in the seat 30. The ECU 40 may determine the distance between the fixed location of the microphone 50 and the head 72 of an occupant 70 via the seat sensor assembly 60 (e.g., the camera 62 and/or the seat motor sensors 66).

In embodiments, the ECU 40 may be configured to receive information from the camera 62 to determine the position of the head 72 of an occupant 70 (e.g., via image processing or other position/location determining methods). The fixed location (e.g., coordinates) of the microphone 50 may be stored in a memory 42 of the ECU 40. The ECU 40 may be configured to compare the fixed location of the microphone 50 with the information from the camera 62 to determine (e.g., calculate) the distance between the head 72 of an occupant 70 and the microphone 50.

With embodiments, the ECU 40 may be configured to use information from the seat motor sensors 66 to determine a location of the head 72 of an occupant 70. The ECU 40 may be configured to receive information from the seat motor sensors 66 about the positions of the seat back 32 and/or the seat base 34 to determine the rotational position, the X-position, the Y-position, and/or the Z-position of the head restraint 36. The ECU 40 may compare the position of the head restraint 36 with the fixed location of the microphone 50 to determine the distance from the microphone 50 to the head restraint 36 (e.g., the head restraint 36 may be an approximated location of the head 72 of an occupant 70).

In embodiments, the ECU 40 may be configured to determine the amount of gain to apply to one or more microphones 50 based on the position of the seat 30 and/or the occupant 70 (which may be approximated by the position of the seat 30). The ECU 40 may be configured to compare the initial position of the seat 30 with the current position of the seat 30 and determine the gain of the microphone 50 according to the difference between the initial and current positions. For example and without limitation, if the seat motor sensors 66 provide information to the ECU 40 that the seat 30 has been moved from the initial position away from the microphone 50, the ECU 40 may increase the gain and/or sensitivity (e.g., proportional to the length of the movement), or vice versa. In some situations, the ECU 50 may adjust the gain and/or sensitivity without explicitly determining the distance between the microphone 50 and the occupant 70 (e.g., the ECU 50 may adjust the gain according to the change in seat position).

In embodiments, the ECU 40 may be configured to adjust one or more parameters associated with the microphone 50 (e.g., gain, sensitivity, etc.). For example and without limitation, the ECU 40 may modify the gain and/or the sensitivity of the microphone 50 itself, and/or the ECU 40 may be configured to apply a gain to signals received from the microphone 50. The ECU 40 may increase the gain (e.g., the received signal from the microphone 50 may be amplified) and/or the sensitivity associated with the microphone 50 based on the distance of the head 72 of an occupant 70 from the microphone 50. For example and without limitation, as the distance between the head 72 of an occupant 70 and the microphone 50 increases, the ECU 40 may increase the gain and/or sensitivity associated with the microphone 50. If the microphone 50 is disposed in the head restraint 36, the gain applied to the input of the microphone 50 may be relatively small compared to if the microphone 50 is disposed in the center and/or front of the vehicle cabin 26 (e.g., a fixed location). The ECU 40 may increase the gain and/or sensitivity associated with the microphone 50 to facilitate processing of voice commands received by the microphone 50. The ECU 40 may select the appropriate amount of gain and/or sensitivity via information from the microphone 50 and/or the seat sensor assembly 60. For example and without limitation, the ECU 40 may apply a larger gain to an occupant 70 with a quiet voice and/or the ECU 40 may apply a smaller gain to an occupant 70 with a loud voice.

With embodiments, the ECU 40 may be configured to actively/dynamically adjust the gain and/or sensitivity associated with the microphone 50. For example and without limitation, the ECU 40 may continuously or substantially continuously determine the location of the head 72 of an occupant 70 and the position of the seat 30 via the seat sensor assembly 60 (e.g., the camera 62, the proximity sensors 64, and/or the seat motor sensors 66), at least while the seat 30 is moving. As the seat 30 moves, the occupant 70 may move with the seat 30. The occupant 70 may provide a command while the seat 30 is moving, and/or the ECU 40 may be configured to dynamically adjust the gain/sensitivity as the seat 30 and the occupant 70 move, such as while an occupant 70 is providing a command (e.g., the ECU 40 may change the gain/sensitivity during the same command). For example and without limitation, the gain associated with the microphone 50 may increase while the head 72 of the occupant 70 moves rearward (e.g., if a first command was to move the seat base 34 rearward) and the occupant 70 commands the seat back 32 to tilt rearward. The ECU 40 may actively adjust the gain/sensitivity associated with the microphone 50 as the distance between the head 72 of the occupant 70 and the microphone 50 increases and decreases. The ECU 40 may be configured to move the microphone 50 upon determining the distance between the occupant 70 and the microphone 50. For example and without limitation, the ECU 40 may move the microphone 50 closer to the occupant 70 such that gain may or may not be adjusted).

With embodiments, the ECU 40 may be configured to modify the gain and/or sensitivity associated with the microphone 50 independently of the sound received by microphone 50. For example and without limitation, the modification may be based entirely on the position of the occupant 70 and/or the position of the seat 30 (and the distance therebetween). Additionally or alternatively, the ECU 40 (and/or the microphone 50) may be configured to determine an initial gain/sensitivity according to the sound received by the microphone 50. The ECU 40 may then modify the initial gain/sensitivity according to the position of the occupant 70 and/or the position of the seat 30. For example and without limitation, the ECU 40 may determine that additional gain may need to be applied and/or reduced after the initial gain is applied (e.g., based on the distance between the microphone 50 and the head 72 of an occupant 70).

In embodiments, such as generally illustrated in FIG. 5, the electrical assembly 20 may include more than one microphone 50. For example and without limitation, each seat 30 in a vehicle 22 may include a microphone 50 for receiving the voice command of the respective occupant 70. The vehicle 22 may include a fixed microphone 50 disposed in the front the vehicle cabin 26, a fixed microphone 50 disposed in the middle of the vehicle cabin 26, a fixed microphone 50 disposed in the rear of the vehicle cabin 26, and/or at least one microphone 50 disposed in a head restraint 36. Each of the microphones 50 may be connected to the ECU 40 and/or the ECU 40 may be configured to receive information from the microphones 50. The ECU 40 may be configured to determine which microphone 50 is closest to the occupant 70 commanding movement of a seat 30. The ECU 40 may be configured to adjust the gain/sensitivity of one or more microphones 50 in relation to the occupant 70. For example and without limitation, the ECU 40 may increase the gain associated with the microphone 50 nearest to the occupant 70, and/or the ECU 40 may reduce the gain of the other microphones 50 located farther from the occupant 70.

With embodiments, such as generally illustrated in FIG. 5, the ECU 40 may be configured to determine a direction of a seat 30 (e.g., forward facing, rearward facing, angled, etc.) via the seat sensor assembly 60. If the microphone 50 is disposed in a fixed location of the vehicle cabin 26, the ECU 40 may be configured to determine whether a seat 30 is facing away from the microphone 50. If the seat 30 is facing the microphone 50, the ECU 40 may be configured to adjust the amount of gain applied to the input received by the microphone 50 according to the distance between the head 72 of an occupant 70 and the microphone 50. If the seat 30 is facing away from the microphone 50, the ECU 40 may be configured to adjust the amount of gain associated with the microphone 50 based on the distance between the head 72 of the occupant 70 and the microphone 50, and/or the ECU 40 may be configured to increase the gain an additional amount to compensate for the seat 30 facing away from the microphone 50.

In embodiments, the ECU 40 may be configured to activate the microphone(s) 50 from a first state (e.g., a sleep mode) to a second state (e.g., a command receiving mode) upon sensing a wake-up phrase/command. The ECU 40 may periodically or continuously receive information from the microphone 50 in the first state (e.g., the ECU 40 may periodically or continuously monitor the microphone 50 input for the wake-up phrase). Once the ECU 40 detects the wake-up phrase, the ECU 40 may lower the volume of one or more speakers in the vehicle 22 (the ECU 40 may be connected to the vehicle speakers). The ECU 40 may be configured to detect seat movement commands and/or move the vehicle seat(s) 30 after the ECU 40 detects the wake-up phrase. The ECU 40 may restore volume of the vehicle speakers once voice commands are no longer detected, and/or may cause the microphone 50 to return to the first state. The ECU 40 may again periodically or continuously monitor the information from the microphone 50 for the wake-up phrase. The ECU 40 may be configured to detect a seat movement command without first detecting a wake-up phrase. The ECU 40 may monitor all conversations within the vehicle 22 via the microphones 50 and/or move the seat 30 upon detecting a seat movement command (e.g., via natural language processing).

With embodiments, the ECU 40 may be configured to identify the occupant 70 that provided the wake-up phrase via voice recognition. The voice of the occupant 70 that provided the wake-up phrase may be detected by the ECU 40 (e.g., one or more microphones) and/or the voice may be saved to the memory unit 42. The ECU 40 may be configured to execute a seat movement command if the ECU 40 detects that the same occupant 70 provided the wake-up phrase and the seat movement command. Additionally or alternatively, the ECU 40 may be configured to determine the location of the occupant 70 that provided the wake-up phrase via triangulation and a plurality of microphones 50. One or more microphones 50 may detect the wake-up phrase (via the ECU 40) and the ECU 40 may be configured to determine the location of the occupant 70 from the reception strength/amplitude of the wake-up phrase. The ECU 40 may determine the location of origin of the seat movement command via the one or more microphones 50 to verify that the same occupant 70 provided the wake-up phrase and the seat movement command. If more than one occupant is speaking in the vehicle 22, the ECU 40 may be configured to use information from the microphones 50, the camera 62, and/or the biometric sensors 68 to verify which occupant 70 said the wake-up phrase and/or the seat movement command.

With embodiments, the language of the wake-up phrase and/or seat movement commands may change according to the default language of the vehicle 22. The ECU 40 may include a database of languages (e.g., the database of languages may be stored in a memory unit 42 of the ECU 40). The database of languages may include wake-up commands and seat movement commands. The ECU 40 may periodically or continuously monitor the microphone 50 for wake-up commands in some or all of the languages stored in the database. Upon sensing a wake-up command in a different language than the default language of the vehicle 22, the ECU 40 may change the expected language of the voice commands to the detected language. The ECU 40 may change the language associated with the microphone 50 closest to the origin of the voice command to the detected language. The ECU 40 may be configured to detect one or more languages from the one or more microphones 50. For example the ECU 40 may be configured to recognize voice commands in a first language from a first microphone 50 and/or voice commands in a second language from a second microphone 50. If the ECU 40 changes the expected language of the voice commands, the ECU 40 may or may not change the default language of the vehicle 22. The vehicle seat 30 may include a default language, and/or upon inserting the vehicle seat 30 in the vehicle 22, the ECU 40 may automatically select the language associated with the inserted seat 30 as the voice command language. Additionally or alternatively, the ECU 40 may be configured to change the language associated with the seat 30 to a default language. The ECU 40 may be configured to determine the geographical location of the vehicle 22. The ECU 40 may be configured to associate a default/expected language (e.g., from the database of languages) with the geographical location and/or set the expected language of the voice commands according to the geographical location.

In embodiments, the ECU 40 may be configured to receive information from the camera 62 (e.g., the seat sensor assembly 60), and/or the ECU 40 may determine which occupant 70 is speaking by tracking movement of the mouth 74 of an occupant 70. For example and without limitation, the ECU 40 may determine (via the camera 62) which occupant 70 said the wake-up command and/or the ECU 40 may actuate the seat motors 24 of the respective seat 30 that the occupant 70 is sitting in. Additionally or alternatively, the command provided by the occupant 70 may include an identifier of the seat 30 to be moved, the ECU 40 may be configured to recognize the identifier, and/or the ECU 40 may be configured to move the identified seat.

With embodiments, the electrical assembly 20 may include one or more biometric sensors 68, and/or the biometric sensors 68 may be connected to the ECU 40. The ECU 40 may be configured to receive information from the biometric sensors 68. One or more seats 30 may include a biometric sensor 68. A biometric sensor 68 may be configured to sense a change in heart rate, respiratory functions, and/or other biometric signals to determine that an occupant 70 may be speaking. The ECU 40 may be configured to analyze information from the biometric sensors 68 and/or the camera 62 to verify the occupant 70 that may be speaking and/or the respective seat 30 to be moved.

Figure 6:
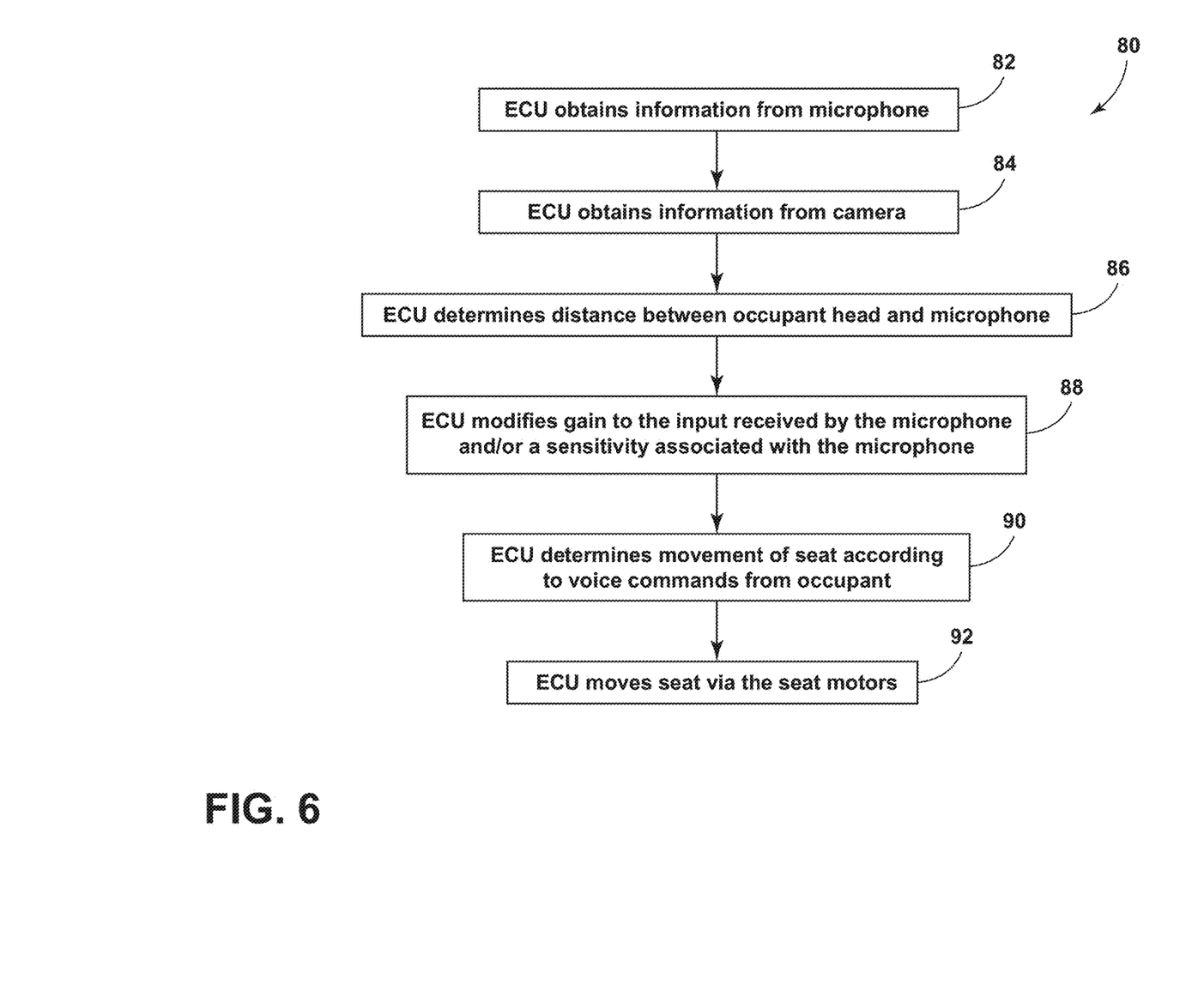
FIG. 6 is a flow chart generally illustrating a method of operating an electrical assembly according to teachings of the present disclosure.

With embodiments, such as generally illustrated in FIG. 6, a method 80 of operating an electrical assembly 20 (and/or moving a vehicle seat 30) may include providing a seat 30, an ECU 40, a microphone 50, and/or a seat sensor assembly 60. The seat sensor assembly 60 may include a camera 62. The method 80 may include the ECU 40 obtaining information from the microphone 50 and/or the ECU 40 monitoring the input from the microphone 50 for a wake-up phrase (step 82). The method 80 may include obtaining information from the camera 62 and/or a biometric sensor 68 to determine the occupant 70 that is speaking (e.g., the occupant 70 that provided the wake-up command) via the ECU 40 (step 84). The method 80 may include the ECU 40 determining the distance between the microphone 50 and the head 72 of the occupant 70 via the camera 62 and/or the seat sensor assembly 60 (step 86). The method 80 may include modifying a gain to the input received by the microphone 50 and/or a sensitivity associated with the microphone 50 in proportion to the distance between the head 72 of the occupant 70 and the microphone 50 (step 88). The method 80 may include determining the desired movement of the seat 30 according to voice commands from the occupant 70 (step 90). The method 80 may include moving and/or stopping the seat 30 in the desired direction/manner according to the voice command (step 92).

With embodiments, a microphone 50 may include one or more of a variety of configurations/components and may be configured to convert received sound into one or more electrical signals.

In embodiments, a position/location of a seat 30 may include a multi-dimensional position, such as an X position, a Y position, a Z position, a rotational position, and/or a tilt position. Positions/locations of a microphone 50 and/or an occupant 70 (and an occupant head 72) may, for example and without limitation, include three dimensions (e.g., X, Y, Z). With embodiments, the ECU 40 may include and/or be configured to create (e.g., via the seat sensor assembly 60) models/simulations (e.g., three-dimensional models) of the vehicle 22, the seat(s) 30, the microphone(s) 50, and/or the occupant(s) 70, and may control movement of the seat(s) 30 according to such models.

While embodiments are described herein in connection with commands for moving a seat 30 for illustrative purposes, the instant disclosure is not limited to seating applications. For example and without limitation, the ECU 40 may be configured to receive and/or implement commands for one or more other vehicle systems or functions (e.g., changing HVAC settings, changing vehicle speed, changing destinations/routes, etc.), which may include modifying the gain and/or sensitivity associated with one or more microphones according to the position of the occupant relative to the microphone(s).

In embodiments, an ECU 40 may include an electronic controller and/or include an electronic processor 44, such as a programmable microprocessor and/or microcontroller. In embodiments, an ECU 40 may include, for example, an application specific integrated circuit (ASIC). An ECU 40 may include a central processing unit (CPU), a memory unit 42 (e.g., a non-transitory computer-readable storage medium), and/or an input/output (I/O) interface. An ECU 40 may be configured to perform various functions, including those described in greater detail herein, with appropriate programming instructions and/or code embodied in software, hardware, and/or other medium. In embodiments, an ECU 40 may include a plurality of controllers. In embodiments, ECU 40 may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that an electronic control unit (ECU) 40, a system, and/or a processor 44 as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, comprising:
    a seat;
    an electronic control unit configured to control movement of the seat;
    a seat sensor assembly; and
    a microphone connected to the electronic control unit;
    wherein the electronic control unit is configured to modify at least one of a gain and a sensitivity associated with the microphone according to information from the seat sensor assembly; and
    the information from the seat sensor assembly includes whether the seat is facing forward, is facing rearward, or is disposed at an angle between forward and rearward.

2. The electrical assembly of claim 1, wherein the electronic control unit is configured to determine a distance between a position of an occupant and the microphone; and
    the electronic control unit is configured to modify the at least one of the gain and the sensitivity associated with the microphone according to the distance.

3. The electrical assembly of claim 1, including a plurality of additional microphones;
    wherein the seat includes a seat base, a seat back, and a head restraint; and the microphone is connected to the head restraint;
    the electronic control unit is configured to determine a closest microphone of the microphone and the plurality of additional microphones that is closest to an occupant; and
    the electronic control unit is configured to increase the gain and/or sensitivity of the closest microphone.

4. The electrical assembly of claim 1, wherein the electronic control unit is configured to determine a change in seat position via the seat sensor assembly; and
    the electronic control unit is configured to determine a position of an occupant according to the change in seat position.

5. The electrical assembly of claim 1, wherein the electronic control unit includes an expected language;
    the seat includes a default language; and
    the electronic control unit is configured to set the expected language to the default language when the seat is connected with a vehicle associated with the electrical assembly.

6. The electrical assembly of claim 1, wherein the seat sensor assembly includes one or more seat motor sensors.

7. The electrical assembly of claim 1, including a biometric sensor configured to obtain heart rate information and/or respiratory information of an occupant;
    wherein the electronic control unit is configured to determine a source of a voice command via the heart rate information and/or respiratory information.

8. The electrical assembly of claim 1, wherein the seat sensor assembly includes one or more biometric sensors; and
    the electronic control unit is configured to identify an occupant according to information from the one or more biometric sensors.

9. The electrical assembly of claim 1, wherein the electronic control unit is configured to determine a position of a head and/or a mouth of an occupant of the seat according to information from the seat sensor assembly; and
    the electronic control unit is configured to track movement of said mouth of said occupant to determine if said occupant or another occupant is speaking.

10. The electrical assembly of claim 1, wherein the electronic control unit is configured to receive information from a camera of the seat sensor assembly to determine which occupant is speaking.

11. The electrical assembly of claim 1, wherein the microphone includes a first state and a second state; and
    the electronic control unit is configured to cause the microphone to change from the first state to the second state if an occupant provides a wake-up voice command.

12. The electrical assembly of claim 11, wherein, when the microphone is in the second state, the electronic control unit is configured to receive one or more seat movement commands; and
    the electronic control unit is configured to confirm that the occupant that provided the wake-up voice command also provided the one or more seat movement commands.

13. The electrical assembly of claim 12, wherein when the microphone is in the second state, the electronic control unit is configured to move the seat according to the one or more seat movement commands.

14. The electrical assembly of claim 1, wherein the electronic control unit is configured to increase the gain and/or sensitivity of the microphone to a greater degree when the seat is facing rearward than when the seat is facing forward.

15. The electrical assembly of claim 1, including at least one additional seat and at least one additional microphone;
    wherein the microphone is connected to the seat; and each additional microphone is connected to a respective additional seat.

16. A method of operating an electrical assembly, the method including:
    providing an electronic control unit, a seat, a microphone, and a seat sensor assembly;
    obtaining, via the electronic control unit, first information from the seat sensor assembly; and
    modifying, via the electronic control unit, at least one of a gain and a sensitivity associated with the microphone according to the first information;
    wherein the first information includes whether the seat is facing the microphone or facing away from the microphone.

17. The method of claim 16, including:
    obtaining, via the electronic control unit, second information from the microphone;
    determining, via the electronic control unit and the second information, a desired movement of the seat; and
    moving the seat according to the desired movement.

18. The method of claim 17, including creating a three-dimensional model of the seat, the microphone, and an occupant;
    wherein modifying at least one of the gain and the sensitivity includes (i) determining, via the first information, a position of said occupant relative to the microphone, and (ii) modifying at least one of the gain and the sensitivity according to the position; and
    moving the seat according to the desired movement includes moving the seat according to (i) the desired movement and (ii) the three-dimensional model.

19. The method of claim 17, wherein determining the desired movement of the seat includes determining a source of a voice command via a camera of the seat sensor assembly.

20. The method of claim 16, including determining a language of a voice command and changing an expected language to the language of the voice command.

\* \* \* \* \*